US010982026B2

(12) United States Patent
Yoo et al.

(10) Patent No.: US 10,982,026 B2
(45) Date of Patent: Apr. 20, 2021

(54) METHOD OF PREPARING CONJUGATED DIENE-BASED POLYMER BY CONTINUOUS POLYMERIZATION

(71) Applicant: LG Chem, Ltd., Seoul (KR)

(72) Inventors: Suk Joon Yoo, Daejeon (KR); Sung Ho Park, Daejeon (KR); Soo Young Choi, Daejeon (KR); Jeong Heon Ahn, Daejeon (KR)

(73) Assignee: LG Chem, Ltd.

(*) Notice: Subject to any disclaimer, the term of this patent is extended or adjusted under 35 U.S.C. 154(b) by 0 days.

(21) Appl. No.: 16/627,540

(22) PCT Filed: Dec. 26, 2017

(86) PCT No.: PCT/KR2017/015490

§ 371 (c)(1),
(2) Date: Dec. 30, 2019

(87) PCT Pub. No.: WO2019/083092

PCT Pub. Date: May 2, 2019

(65) Prior Publication Data

US 2020/0123288 A1 Apr. 23, 2020

(30) Foreign Application Priority Data

Oct. 26, 2017 (KR) ........................ 10-2017-0140413

(51) Int. Cl.

*C08F 136/00* (2006.01)
*C08F 136/04* (2006.01)
*C08F 4/52* (2006.01)
*C08F 136/06* (2006.01)
*C08F 4/54* (2006.01)
*C08F 236/04* (2006.01)
*C08F 36/04* (2006.01)
*C08F 2/00* (2006.01)

(52) U.S. Cl.

CPC ............ *C08F 136/06* (2013.01); *C08F 2/001* (2013.01); *C08F 4/545* (2013.01); *C08F 36/04* (2013.01); *C08F 136/04* (2013.01); *C08F 236/04* (2013.01)

(58) Field of Classification Search

CPC .......... C08F 2/001; C08F 4/545; C08F 36/04; C08F 136/04; C08F 136/06; C08F 236/04
See application file for complete search history.

(56) References Cited

U.S. PATENT DOCUMENTS 4,136,244 A * 1/1979 Massoubre ............. C08F 36/04 526/173
4,136,245 A * 1/1979 Massoubre ............. C08F 36/04 526/174
4,843,120 A * 6/1989 Halasa .................. B60C 1/0016 525/53
5,194,491 A * 3/1993 Sakita ................... C08F 279/02 525/53
5,955,537 A * 9/1999 Steininger Clites .. C08F 297/04 525/271
6,372,863 B1 * 4/2002 Kerns ................... C08F 236/10 525/250
6,391,990 B1 5/2002 Ishino et al.
6,444,762 B1 * 9/2002 Fischer ..................... C08F 4/44 502/157
6,617,406 B2 * 9/2003 Castner ................. C08F 136/06 526/142
6,627,715 B2 * 9/2003 Halasa ................. B01J 31/0212 526/176
6,767,969 B2 * 7/2004 Sasagawa ............... C08C 19/02 525/232
6,930,146 B1 * 8/2005 Okada ..................... C08L 21/00 525/130
7,064,171 B1 * 6/2006 Halasa .................. B60C 1/0016 152/209.1
8,981,000 B2 * 3/2015 Hamann ............... C08F 212/08 524/575
10,118,974 B2 * 11/2018 Sohn ........................ C08L 15/00
10,253,116 B2 * 4/2019 Soddu ................... C08F 112/08
10,266,614 B2 * 4/2019 Sohn ......................... B60C 1/00
2002/0107339 A1 8/2002 Knauf et al.
2003/0153698 A1 * 8/2003 Halasa ................... B01J 31/128 526/173

(Continued)

FOREIGN PATENT DOCUMENTS

EP 1026181 A1 8/2000
EP 3176193 A1 6/2017

(Continued)

OTHER PUBLICATIONS

International Search Report for Application No. PCT/KR2017/015490 dated Jul. 25, 2018, 4 pages.

(Continued)

*Primary Examiner* — Rip A Lee

(74) *Attorney, Agent, or Firm* — Lerner, David, Littenberg, Krumholz & Mentlik, LLP

(57) ABSTRACT

A method of preparing a conjugated diene-based polymer by continuous polymerization using two or more reactors is provided. The method of preparing a conjugated diene-based polymer includes a conjugated diene-based polymer having excellent cis 1,4 bond content and linearity, by adjusting the ratio of a polymer and a monomer in each reactor and by adjusting the retention time in a second reactor and resolving the deterioration phenomenon of physical properties, while improving productivity by reducing the contamination of the reactors.

10 Claims, No Drawings

(56) References Cited

U.S. PATENT DOCUMENTS

| | | | |
|---|---|---|---|
| 2006/0063897 A1 | 3/2006 | Nagafuchi et al. | |
| 2011/0184137 A1 | 7/2011 | Qin et al. | |
| 2017/0002103 A1 | 1/2017 | Sohn et al. | |
| 2017/0226236 A1 | 8/2017 | Lee et al. | |
| 2017/0240669 A1 | 8/2017 | Kim et al. | |
| 2019/0256635 A1* | 8/2019 | Kim | C08C 19/25 |

FOREIGN PATENT DOCUMENTS

| | | | |
|---|---|---|---|
| JP | H07002808 | A | 1/1995 |
| JP | 3175350 | B2 | 6/2001 |
| KR | 20030072620 | A | 9/2003 |
| KR | 20110031464 | A | 3/2011 |
| KR | 20130076615 | A | 7/2013 |
| KR | 20150028615 | A | 3/2015 |
| KR | 20160060563 | A | 5/2016 |
| KR | 20170053467 | A | 5/2017 |
| KR | 20170075177 | A | 7/2017 |

OTHER PUBLICATIONS

Extended European Search Report for Application No. 17929788.2 dated Aug. 11, 2020, 5 pages.

* cited by examiner

METHOD OF PREPARING CONJUGATED DIENE-BASED POLYMER BY CONTINUOUS POLYMERIZATION

CROSS-REFERENCE TO RELATED APPLICATIONS

The present application is a National Stage Entry under 35 U.S.C. § 371 of International Application No. PCT/KR2017/015490 filed on Dec. 26, 2017 which claims priority to Korean Patent Application No. 10-2017-0140413, filed on Oct. 26, 2017, the entire contents of which are incorporated herein by reference.

Technical Field

The present invention relates to a method of preparing a conjugated diene-based polymer which is capable of reducing contaminant degree of a reactor and has high linearity and excellent cis 1,4 bond content.

BACKGROUND ART

According to the recent demand for cars having a low fuel consumption ratio, a modified conjugated diene-based polymer having modulational stability represented by wet skid resistance as well as low rolling resistance, and excellent abrasion resistance and tensile properties is required as a rubber material for tires.

In order to reduce the rolling resistance of tires, there is a method of reducing hysteresis loss of vulcanized rubber, and rebound resilience at 50° C. to 80° C., tan δ Goodrich heating, or the like is used as an evaluation index of the vulcanized rubber. That is, it is desirable to use a rubber material having high rebound resilience at the above temperature or low tan δ or Goodrich heat generation.

Natural rubbers, polyisoprene rubbers, or polybutadiene rubbers are known as rubber materials having low hysteresis loss, but these rubbers may have a limitation of low wet skid resistance. Thus, recently, a conjugated diene-based (co) polymer, such as styrene-butadiene rubbers (hereinafter, referred to as “SBR”) or butadiene rubbers (hereinafter, referred to as “BR”), are prepared by emulsion polymerization or solution polymerization to be used as a rubber for tires.

In a case in which the BR or SBR is used as the rubber material for tires, the BR or SBR is typically used by being blended with a filler, such as silica or carbon black, to obtain physical properties required for tires. However, since affinity of the Br or SBR with the filler is poor, physical properties, such as abrasion resistance, crack resistance, and processability, may rather be reduced.

Thus, as a method of increasing dispersibility of the SBR and the filler such as silica and carbon black, a method of modifying a polymerization active site of a conjugated diene-based polymer obtained by anionic polymerization using organolithium with a functional group capable of interacting with the filler has been proposed. For example, a method of modifying a polymerization active terminal of a conjugated diene-based polymer with a tin-based compound or introducing an amino group, or a method of modifying with an alkoxysilane derivative has been proposed.

Also, as a method of increasing dispersibility of the BR and the filler such as silica and carbon black, a method of modifying a living active terminal with a specific coupling agent or modifier has been developed in a living polymer obtained by coordination polymerization using a catalyst composition which includes a lanthanide rare earth element compound.

Meanwhile, SBR or BR is prepared by a batch or continuous polymerization, and if the batch polymerization is applied for the preparation, the molecular weight distribution of a prepared polymer is narrow, and it is advantageous in terms of the improvement of physical properties. However, there are limitations of low productivity and poor processability. In order to improve the processability in the batch polymerization, a method of injecting monomer in installments at a specific conversion ratio was applied as an example of increasing the branch proportion in a polymer chain, but limitations concerning the improvement of productivity and physical properties, which are also generated in the batch polymerization, still arise.

On the contrary, if the continuous polymerization is applied for the preparation, polymerization is continuously performed and productivity is excellent, and advantages are achieved in view of the improvement of processability. However, molecular weight distribution is wide, and physical properties are not good. In addition, the continuous polymerization has higher productivity than the batch polymerization, but the increase of continuous operation time by reducing contamination of a reactor is consistently required.

Therefore, for preparing SBR or BR, a method for achieving excellent productivity and processability while improving physical properties at the same time is required.

PRIOR ART DOCUMENT

Patent Document (Patent Document 1) JP 3175350 B2

DISCLOSURE OF THE INVENTION

Technical Problem

The present invention has been devised to solve the above-mentioned problems of the conventional technique and provides a method of preparing a conjugated diene-based polymer for providing a conjugated diene-based polymer with high linearity and cis 1,4 bond content, and largely reducing the contaminant degree of a reactor to increase productivity by controlling polymerization reaction which is performed in each reactor by adjusting the ratio of a polymer and a monomer.

Technical Solution

According to an aspect of the present invention, there is provided a method of preparing a conjugated diene-based polymer by a continuous preparation method which is performed in two or more reactors, including injecting a conjugated diene-based monomer to a first reactor to prepare a conjugated diene-based polymer, wherein polymerization reaction is performed so that a weight ratio of a polymer to a monomer in a reaction mixture is 5.6 or more, and transporting the reaction mixture to a second reactor; and performing polymerization reaction so that a weight ratio of a polymer to a monomer in a reaction mixture is 49 or less, wherein polymerization in the first reactor and the second reactor is performed in the presence of a catalyst composition in a hydrocarbon solvent.

Advantageous Effects

A continuous polymerization using two or more reactors is applied to the preparation method according to the present invention, but polymerization reaction in each reactor is controlled by adjusting the ratio of a polymer and a monomer, thereby preparing a conjugated diene-based polymer having high linearity and cis 1,4 bond content and thus, improving productivity by largely reducing contaminant degree in a reactor.

MODE FOR CARRYING OUT THE INVENTION

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

The term "continuous polymerization" used in the present invention may mean a process continuously supplying a material participating polymerization to a reactor while continuously discharging the product produced by the polymerization.

The term "reactant" used in the present invention represents a material undergoing polymerization in each reactor prior to obtaining an active polymer or a conjugated diene-based polymer after finishing polymerization, for example, may include at least one of a catalyst composition, a conjugated diene-based monomer and an intermediate produced having a polymer type.

The present invention provides a method of preparing a conjugated diene-based polymer having excellent productivity by reducing contaminant degree of a reactor and high linearity and improved viscoelasticity properties, by controlling polymerization reaction in a first reactor and a second reactor by adjusting the weight ratio of a polymer and a monomer in each reactor as a control factor.

The preparation method according to an embodiment of the present invention is a continuous preparation method which is performed in two or more reactors, including injecting a conjugated diene-based monomer to a first reactor to prepare a conjugated diene-based polymer, wherein polymerization reaction is performed so that a weight ratio of a polymer to a monomer in a reaction mixture is 5.6 or more, and transporting the reaction mixture to a second reactor; and performing polymerization reaction so that a weight ratio of a polymer to a monomer in a reaction mixture is 49.0 or less, wherein polymerization in the first reactor and the second reactor is performed in the presence of a catalyst composition in a hydrocarbon solvent.

The conjugated diene-based monomer is not specifically limited, but, for example, may be at least one selected from the group consisting of 1,3-butadiene, 2,3-dimethyl-1,3-butadiene, piperylene, 3-butyl-1,3-octadiene, isoprene, and 2-phenyl-1,3-butadiene.

The hydrocarbon solvent is not specifically limited, but, for example, may be at least one selected from the group consisting of n-pentane, n-hexane, n-heptane, isooctane, cyclohexane, toluene, benzene, and xylene.

The catalyst composition may include a lanthanide rare earth element-containing compound.

The catalyst composition may be used in an amount such that the lanthanide rare earth element-containing compound is included in an amount of 0.1 mmol to 0.5 mmol based on total 100 g of the conjugated diene-based monomer, and may particularly be used in an amount such that the lanthanide rare earth element-containing compound is included in an amount of 0.1 mmol to 0.4 mmol, more particularly, 0.1 mmol to 0.25 mmol, based on total 100 g of the conjugated diene-based monomer.

The lanthanide rare earth element-containing compound is not particularly limited, but, for example, may be at least one compound of rare earth metals with an atomic number of 57 to 71, such as lanthanum, neodymium, cerium, gadolinium, and praseodymium, and may specifically be a compound including at least one selected from the group consisting of neodymium, lanthanum, and gadolinium.

Also, the lanthanide rare earth element-containing compound may include carboxylates containing the above-described rare earth element (e.g., neodymium acetate, neodymium acrylate, neodymium methacrylate, neodymium gluconate, neodymium citrate, neodymium fumarate, neodymium lactate, neodymium maleate, neodymium oxalate, neodymium 2-ethylhexanoate, or neodymium neodecanoate); organophosphates containing the above-described rare earth element (e.g., neodymium dibutyl phosphate, neodymium dipentyl phosphate, neodymium dihexyl phosphate, neodymium diheptyl phosphate, neodymium dioctyl phosphate, neodymium bis(1-methyl heptyl) phosphate, neodymium bis(2-ethylhexyl) phosphate, or neodymium didecyl phosphate); organophosphonates containing the above-described rare earth element (e.g., neodymium butyl phosphonate, neodymium pentyl phosphonate, neodymium hexyl phosphonate, neodymium heptyl phosphonate, neodymium octyl phosphonate, neodymium (1-methylheptyl) phosphonate, neodymium (2-ethylhexyl) phosphonate, neodymium decyl phosphonate, neodymium dodecyl phosphonate, or neodymium octadecyl phosphonate); organophosphinates containing the above-described rare earth element (e.g., neodymium butylphosphinate, neodymium pentylphosphinate, neodymium hexylphosphinate, neodymium heptylphosphinate, neodymium octylphosphinate, neodymium (1-methylheptyl)phosphinate, or neodymium (2-ethylhexyl)phosphinate); carbamates containing the above-described rare earth element (e.g., neodymium dimethylcarbamate, neodymium diethylcarbamate, neodymium diisopropylcarbamate, neodymium dibutylcarbamate, or neodymium dibenzylcarbamate); dithiocarbamates containing the above-described rare earth element (e.g., neodymium dimethyldithiocarbamate, neodymium diethyldithiocarbamate, neodymium diisopropyldithiocarbamate, or neodymium dibutyldithiocarbamate); xanthates containing the above-described rare earth element (e.g., neodymium methylxanthate, neodymium ethylxanthate, neodymium isopropylxanthate, neodymium butylxanthate, or neodymium benzylxanthate); 0-diketonates containing the above-described rare earth element (e.g., neodymium acetylacetonate, neodymium trifluoroacetylacetonate, neodymium hexafluoroacetylacetonate, or neodymium benzoylacetonate); alkoxides or aryloxides containing the above-described rare earth element (e.g., neodymium methoxide, neodymium ethoxide, neodymium isopropoxide, neodymium phenoxide, or neodymium nonylphenoxide); halides or pseudo-halides containing the above-described rare earth element (e.g., neodymium fluoride, neodymium chloride, neodymium bromide, neodymium iodide, neodymium cyanide, neodymium cyanate, neodymium thiocyanate, or neodymium azide); oxyhalides containing the above-described rare earth element (e.g., neodymium oxyfluoride, neodymium oxychloride, or neodymium oxybromide); or organolanthanide rare earth element-containing compounds including at least one rare earth element-carbon bond (e.g., $Cp_3Ln$, $Cp_2LnR$, $Cp_2LnCl$, $CpLnCl_2$, CpLn (cyclooctatetraene), $(C_5Me_5)_2LnR$, $LnR_3$, $Ln(allyl)_3$, or $Ln(allyl)_2Cl$, where Ln represents a rare earth metal element, and R represents a hydrocarbyl group), and may include any one thereof or a mixture of two or more thereof.

Specifically, the lanthanide rare earth element-containing compound may include a neodymium compound represented by Formula 1 below.

[Formula 1]

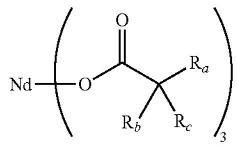

In Formula 1, Ra to Rc are independently hydrogen or an alkyl group having 1 to 12 carbon atoms, but all Ra to Rc are not hydrogen at the same time.

More particularly, the neodymium compound may be at least one selected from the group consisting of $Nd(2,2\text{-diethyl decanoate})_3$, $Nd(2,2\text{-dipropyl decanoate})_3$, $Nd(2,2\text{-dibutyl decanoate})_3$, $Nd(2,2\text{-dihexyl decanoate})_3$, $Nd(2,2\text{-dioctyl decanoate})_3$, $Nd(2\text{-ethyl-2-propyl decanoate})_3$, $Nd(2\text{-ethyl-2-butyl decanoate})_3$, $Nd(2\text{-ethyl-2-hexyl decanoate})_3$, $Nd(2\text{-propyl-2-butyl decanoate})_3$, $Nd(2\text{-propyl-2-hexyl decanoate})_3$, $Nd(2\text{-propyl-2-isopropyl decanoate})_3$, $Nd(2\text{-butyl-2-hexyl decanoate})_3$, $Nd(2\text{-hexyl-2-octyl decanoate})_3$, $Nd(2,2\text{-diethyl octanoate})_3$, $Nd(2,2\text{-dipropyl octanoate})_3$, $Nd(2,2\text{-dibutyl octanoate})_3$, $Nd(2,2\text{-dihexyl octanoate})_3$, $Nd(2\text{-ethyl-2-propyl octanoate})_3$, $Nd(2\text{-ethyl-2-hexyl octanoate})_3$, $Nd(2,2\text{-diethyl nonanoate})_3$, $Nd(2,2\text{-dipropyl nonanoate})_3$, $Nd(2,2\text{-dibutyl nonanoate})_3$, $Nd(2,2\text{-dihexyl nonanoate})_3$, $Nd(2\text{-ethyl-2-propyl nonanoate})_3$, and $Nd(2\text{-ethyl-2-hexyl nonanoate})_3$.

In addition, in another embodiment, in consideration of excellent solubility in the polymerization solvent without a concern for oligomerization, a conversion ratio to a catalytically active species, and the resulting excellent catalytic activity improvement effect, the lanthanide rare earth element-containing compound may specifically be a neodymium-based compound of Formula 1, where $R_a$ is an alkyl group having 4 to 12 carbon atoms, and $R_b$ and $R_c$ are each independently hydrogen or an alkyl group having 2 to 8 carbon atoms, but $R_b$ and $R_c$ are not hydrogen at the same time.

In more particular embodiment, in Formula 1, $R_a$ may be an alkyl group having 6 to 8 carbon atoms, and $R_b$ and $R_c$ may be each independently hydrogen or an alkyl group having 2 to 6 carbon atoms, where $R_b$ and $R_c$ may not be hydrogen at the same time. Specific examples of the neodymium compound may be at least one selected from the group consisting of $Nd(2,2\text{-diethyl decanoate})_3$, $Nd(2,2\text{-dipropyl decanoate})_3$, $Nd(2,2\text{-dibutyl decanoate})_3$, $Nd(2,2\text{-dihexyl decanoate})_3$, $Nd(2,2\text{-dioctyl decanoate})_3$, $Nd(2\text{-ethyl-2-propyl decanoate})_3$, $Nd(2\text{-ethyl-2-butyl decanoate})_3$, $Nd(2\text{-ethyl-2-hexyl decanoate})_3$, $Nd(2\text{-propyl-2-butyl decanoate})_3$, $Nd(2\text{-propyl-2-hexyl decanoate})_3$, $Nd(2\text{-propyl-2-isopropyl decanoate})_3$, $Nd(2\text{-butyl-2-hexyl decanoate})_3$, $Nd(2\text{-hexyl-2-octyl decanoate})_3$, $Nd(2\text{-t-butyl decanoate})_3$, $Nd(2,2\text{-diethyl octanoate})_3$, $Nd(2,2\text{-dipropyl octanoate})_3$, $Nd(2,2\text{-dibutyl octanoate})_3$, $Nd(2,2\text{-dihexyl octanoate})_3$, $Nd(2\text{-ethyl-2-propyl octanoate})_3$, $Nd(2\text{-ethyl-2-hexyl octanoate})_3$, $Nd(2,2\text{-diethyl nonanoate})_3$, $Nd(2,2\text{-dipropyl nonanoate})_3$, $Nd(2,2\text{-dibutyl nonanoate})_3$, $Nd(2,2\text{-dihexyl nonanoate})_3$, $Nd(2\text{-ethyl-2-propyl nonanoate})_3$, and $Nd(2\text{-ethyl-2-hexyl nonanoate})_3$, and among them, the neodymium compound may be at least one selected from the group consisting of $Nd(2,2\text{-diethyl decanoate})_3$, $Nd(2,2\text{-dipropyl decanoate})_3$, $Nd(2,2\text{-dibutyl decanoate})_3$, $Nd(2,2\text{-dihexyl decanoate})_3$, and $Nd(2,2\text{-dioctyl decanoate})_3$.

More particularly, in Formula 1, $R_a$ may be an alkyl group having 6 to 8 carbon atoms, and $R_b$ and $R_c$ may be each independently an alkyl group having 2 to 6 carbon atoms.

As described above, since the neodymium compound represented by Formula 1 includes a carboxylate ligand including alkyl groups of various lengths having 2 or more carbon atoms as a substituent at an α (alpha) position, coagulation of the compound may be blocked by inducing steric changes around the neodymium center metal, and accordingly, oligomerization may be suppressed. Also, since the neodymium compound has high solubility in the polymerization solvent, and the ratio of neodymium located in a center portion, which has difficulties in conversion to the catalytically active species, is reduced, the conversion ratio to the catalytically active species is high.

Furthermore, the lanthanide rare earth element-containing compound according to an embodiment of the present invention may have a solubility of about 4 g or more per 6 g of a hydrocarbon solvent at room temperature (25° C.).

In the present invention, the solubility of the neodymium compound denotes a degree to which the neodymium compound is clearly dissolved without turbidity phenomenon, wherein since the neodymium compound has high solubility as described above, excellent catalytic activity may be achieved.

Also, the lanthanide rare earth element-containing compound according to an embodiment of the present invention may be used in the form of a reactant with a Lewis base. The reactant may improve the solubility of the lanthanide rare earth element-containing compound in the solvent due to the Lewis base and may be stored in a stable state for a long period of time. The Lewis base, for example, may be used in a ratio of 30 mol or less or 1 mole to 10 mol per 1 mol of the rare earth element. Examples of the Lewis base may be acetylacetone, tetrahydrofuran, pyridine, N,N'-dimethylformamide, thiophene, diphenyl ether, triethylamine, an organic phosphorus compound, or a monohydric or dihydric alcohol.

Meanwhile, the catalyst composition may further include at least one of an alkylating agent, a halide, and a conjugated diene-based monomer, in addition to the lanthanide rare earth element-containing compound.

That is, the catalyst composition according to an embodiment of the present invention includes a lanthanide rare earth element-containing compound, and may further include at least one of an alkylating agent, a halide, and a conjugated diene-based monomer.

Hereinafter, the (a) alkylating agent, the (b) halide, and the (c) conjugated diene-based monomer will be separately described in detail.

(a) Alkylating Agent

The alkylating agent is an organometallic compound that may transfer a hydrocarbyl group to another metal, wherein it may act as a cocatalyst. The alkylating agent may be used without specific limitation as long as it is commonly used as an alkylating agent during the preparation of a diene-based polymer, and, for example, may be an organometallic compound, which is soluble in a polymerization solvent and contains a metal-carbon bond, such as an organoaluminum compound, an organomagnesium compound, and an organolithium compound.

Specifically, the organoaluminum compound may include alkylaluminum such as trimethylaluminum, triethylaluminum, tri-n-propylaluminum, triisopropylaluminum, tri-n-butylaluminum, triisobutylaluminum (TIBA), tri-t-butylaluminum, tripentylaluminum, trihexylaluminum, tricyclohexylaluminum, and trioctylaluminum; dihydrocarbylaluminum hydride such as diethylaluminum hydride, di-n-propylaluminum hydride, diisopropylaluminum hydride, di-n-butylaluminum hydride, diisobutylaluminum hydride (DIBAH), di-n-octylaluminum hydride, diphenylaluminum hydride, di-p-tolylaluminum hydride, dibenzylaluminum hydride, phenylethylaluminum hydride, phenyl-n-propylaluminum hydride, phenylisopropylaluminum hydride, phenyl-n-butylaluminum hydride, phenylisobutylaluminum hydride, phenyl-n-octylaluminum hydride, p-tolylethylaluminum hydride, p-tolyl-n-propylaluminum hydride, p-tolylisopropylaluminum hydride, p-tolyl-n-butylaluminum hydride, p-tolylisobutylaluminum hydride, p-tolyl-n-octylaluminum hydride, benzylethylaluminum hydride, benzyl-n-propylaluminum hydride, benzylisopropylaluminum hydride, benzyl-n-butylaluminum hydride, benzylisobutylaluminum hydride, and benzyl-n-octylaluminum hydride; and hydrocarbylaluminum dihydride such as ethylaluminum dihydride, n-propylaluminum dihydride, isopropylaluminum dihydride, n-butylaluminum dihydride, isobutylaluminum dihydride, and n-octylaluminum dihydride. The organomagnesium compound may include an alkyl magnesium compound such as diethylmagnesium, di-n-propylmagnesium, diisopropylmagnesium, dibutylmagnesium, dihexylmagnesium, diphenylmagnesium, and dibenzylmagnesium, and the organolithium compound may include an alkyl lithium compound such as n-butyllithium.

Also, the organoaluminum compound may be aluminoxane.

The aluminoxane may be prepared by reacting a trihydrocarbylaluminum-based compound with water, and may specifically be linear aluminoxane of the following Formula 2a or cyclic aluminoxane of the following Formula 2b:

[Formula 2a]

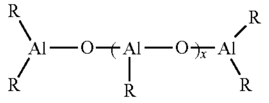

[Formula 2b]

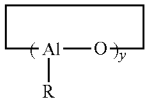

In Formulae 2a and 2b, R is a monovalent organic group bonded to an aluminum atom via a carbon atom, and may be a hydrocarbyl group, and x and y may be each independently an integer of 1 or more, particularly 1 to 100, more particularly 2 to 50.

More particularly, the aluminoxane may include methylaluminoxane (MAO), modified methylaluminoxane (MMAO), ethylaluminoxane, n-propylaluminoxane, isopropylaluminoxane, butylaluminoxane, isobutylaluminoxane, n-pentylaluminoxane, neopentylaluminoxane, n-hexylaluminoxane, n-octylaluminoxane, 2-ethylhexylaluminoxane, cylcohexylaluminoxane, 1-methylcyclopentylaluminoxane, phenylaluminoxane, and 2,6-dimethylphenylaluminoxane, and any one thereof or a mixture of two or more thereof may be used.

In addition, the modified methylaluminoxane may be one in which a methyl group of methylaluminoxane is substituted with a formula group (R), specifically, a hydrocarbon group having 2 to 20 carbon atoms, and may specifically be a compound represented by Formula 3 below.

[Formula 3]

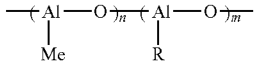

In Formula 3, R is the same as defined above, and m and n may be each independently an integer of 2 or more. Also, in Formula 3, Me represents a methyl group.

Specifically, in Formula 3, R may be an alkyl group having 2 to 20 carbon atoms, a cycloalkyl group having 3 to 20 carbon atoms, an alkenyl group having 2 to 20 carbon atoms, a cycloalkenyl group having 3 to 20 carbon atoms, an aryl group having 6 to 20 carbon atoms, an arylalkyl group having 7 to 20 carbon atoms, an alkylaryl group having 7 to 20 carbon atoms, an allyl group, or an alkynyl group having 2 to 20 carbon atoms, may particularly be an alkyl group having 2 to 20 carbon atoms such as an ethyl group, an isobutyl group, a hexyl group, and an octyl group, and may more particularly be an isobutyl group.

More specifically, the modified methylaluminoxane may be one in which about 50 mol % to 90 mol % of the methyl group of the methylaluminoxane is substituted with the above-described hydrocarbon group. When the amount of the hydrocarbon group substituted in the modified methylaluminoxane is within the above range, the alkylation may be promoted and the catalytic activity may be increased.

The modified methylaluminoxane may be prepared by a common method, and may specifically be prepared using trimethylaluminum and an alkylaluminum except for trimethylaluminum. In this case, the alkylaluminum may be triisopropylaluminum, triethylaluminum, trihexylaluminum, or trioctylaluminum, and any one thereof or a mixture of two or more thereof may be used.

Also, the catalyst composition according to an embodiment of the present invention may include the alkylating agent in a molar ratio of 1 to 200, particularly 1 to 100, more particularly 3 to 20 based on 1 mol of the lanthanide rare earth element-containing compound. If the alkylating agent is included in a molar ratio of greater than 200, catalytic reaction control is not easy during the preparation of a polymer, and an excessive amount of the alkylating agent may induce side reactions.

(b) Halide

The halide is not particularly limited, but, for example, may include elemental halogen, an interhalogen compound, hydrogen halide, an organic halide, a non-metal halide, a metal halide, and an organic metal halide, and any one thereof or a mixture of two or more thereof may be used. Among them, in consideration of catalytic activity enhancement and the resulting improvement effect in reactivity, any one selected from the group consisting of an organic halide, a metal halide, and an organic metal halide, or a mixture of two or more thereof may be used as the halide.

The elemental halogen may include fluorine, chlorine, bromine, or iodine.

Also, the interhalogen compound may include iodine monochloride, iodine monobromide, iodine trichloride, iodine pentafluoride, iodine monofluoride, or iodine trifluoride.

Furthermore, the hydrogen halide may include hydrogen fluoride, hydrogen chloride, hydrogen bromide, or hydrogen iodide.

Also, the organic halide may include t-butyl chloride (t-BuCl), t-butyl bromide, allyl chloride, allyl bromide, benzyl chloride, benzyl bromide, chloro-di-phenylmethane, bromo-di-phenylmethane, triphenylmethyl chloride, triphenylmethyl bromide, benzylidene chloride, benzyliene bromide, methyltrichlorosilane, phenyltrichlorosilane, dimethyldichlorosilane, diphenyldichlorosilane, trimethylchlorosilane (TMSCl), benzoyl chloride, benzoyl bromide, propionyl chloride, propionyl bromide, methyl chloroformate, methyl bromoformate, iodomethane, diiodomethane, triiodomethane (also referred to as 'iodoform'), tetraiodomethane, 1-iodopropane, 2-iodopropane, 1,3-diiodopropane, t-butyl iodide, 2,2-dimethyl-1-iodopropane (also referred to as 'neopentyl iodide'), allyl iodide, iodobenzene, benzyl iodide, diphenylmethyl iodide, triphenylmethyl iodide, benzylidene iodide (also referred to as 'benzal iodide'), trimethylsilyl iodide, triethylsilyl iodide, triphenylsilyl iodide, dimethyldiiodosilane, diethyldiiodosilane, diphenyldiiodosilane, methyltriiodosilane, ethyltriiodosilane, phenyltriiodosilane, benzoyl iodide, propionyl iodide, and methyl iodoformate.

Furthermore, the non-metal halide may include phosphorous trichloride, phosphorous tribromide, phosphorous pentachloride, phosphorous oxychloride, phosphorous oxybromide, boron trifluoride, boron trichloride, boron tribromide, silicon tetrafluoride, silicon tetrachloride ($SiCl_4$), silicon tetrabromide, arsenic trichloride, arsenic tribromide, selenium tetrachloride, selenium tetrabromide, tellurium tetrachloride, tellurium tetrabromide, silicon tetraiodide, arsenic triiodide, tellurium tetraiodide, boron triiodide, phosphorous triiodide, phosphorous oxyiodide, and selenium tetraiodide.

Also, the metal halide may include tin tetrachloride, tin tetrabromide, aluminum trichloride, aluminum tribromide, antimony trichloride, antimony pentachloride, antimony tribromide, aluminum trifluoride, gallium trichloride, gallium tribromide, gallium trifluoride, indium trichloride, indium tribromide, indium trifluoride, titanium tetrachloride, titanium tetrabromide, zinc dichloride, zinc dibromide, zinc difluoride, aluminum triiodide, gallium triiodide, indium triiodide, titanium tetraiodide, zinc diiodide, germanium tetraiodide, tin tetraiodide, tin diiodide, antimony triiodide, and magnesium diiodide.

Furthermore, the organic metal halide may include dimethylaluminum chloride, diethylaluminum chloride, dimethylaluminum bromide, diethylaluminum bromide, dimethylaluminum fluoride, diethylaluminum fluoride, methylaluminum dichloride, ethylaluminum dichloride, methylaluminum dibromide, ethylaluminum dibromide, methylaluminum difluoride, ethylaluminum difluoride, methylaluminum sesquichloride, ethylaluminum sesquichloride (EASC), isobutylaluminum sesquichloride, methylmagnesium chloride, methylmagnesium bromide, ethylmagnesium chloride, ethylmagnesium bromide, n-butylmagnesium chloride, n-butylmagnesium bromide, phenylmagnesium chloride, phenylmagnesium bromide, benzylmagnesium chloride, trimethyltin chloride, trimethyltin bromide, triethyltin chloride, triethyltin bromide, di-t-butyltin dichloride, di-t-butyltin dibromide, di-n-butyltin dichloride, di-n-butyltin dibromide, tri-n-butyltin chloride, tri-n-butyltin bromide, methylmagnesium iodide, dimethylaluminum iodide, diethylaluminum iodide, di-n-butylaluminum iodide, diisobutylaluminum iodide, di-n-octylaluminum iodide, methylaluminum diiodide, ethylaluminum diiodide, n-butylaluminum diiodide, isobutylaluminum diiodide, methylaluminum sesquiiodide, ethylaluminum sesquiiodide, isobutylaluminum sesquiiodide, ethylmagnesium iodide, n-butylmagnesium iodide, isobutylmagnesium iodide, phenylmagnesium iodide, benzylmagnesium iodide, trimethyltin iodide, triethyltin iodide, tri-n-butyltin iodide, di-n-butyltin diiodide, and di-t-butyl tin diiodide.

Also, the catalyst composition according to an embodiment of the present invention may include the halide in an amount of 1 mol to 20 mol, particularly 1 mol to 5 mol, more particularly 2 mol to 3 mol based on 1 mol of the lanthanide rare earth element-containing compound. If the halide is included in an amount of greater than 20 mol, catalytic reaction control is not easy and an excessive amount of the halide may induce side reactions.

Furthermore, the catalyst composition according to an embodiment of the present invention may include a non-coordinating anion-containing compound or a non-coordinating anion precursor compound instead of the halide or with the halide.

Specifically, in the compound containing a non-coordinating anion, the non-coordinating anion is a sterically bulky anion that does not form a coordination bond with an active center of a catalyst system due to steric hindrance, wherein the non-coordinating anion may be a tetraarylborate anion or a fluorinated tetraarylborate anion. Also, the compound containing a non-coordinating anion may include a counter cation, for example, a carbonium cation such as a triarylcarbonium cation; an ammonium cation such as N,N-dialkyl anilinium cation, or a phosphonium cation, in addition to the above-described non-coordinating anion. More particularly, the compound containing a non-coordinating anion may include triphenylcarbonium tetrakis(pentafluorophenyl)borate, N,N-dimethylanilinium tetrakis(pentafluorophenyl)borate, triphenylcarbonium tetrakis [3,5-bis(trifluoromethyl)phenyl]borate, and N,N-dimethylanilinium tetrakis [3,5-bis(trifluoromethyl)phenyl]borate.

Also, the non-coordinating anion precursor, as a compound capable of forming a non-coordinating anion under the reaction conditions, may include a triaryl boron compound ($BE_3$, where E is a strong electron-withdrawing aryl group such as a pentafluorophenyl group and a 3,5-bis(trifluoromethyl)phenyl group).

(c) Conjugated Diene-Based Monomer

Also, the catalyst composition may further include a conjugated diene-based monomer, and, since the catalyst composition is used in the form of a preforming or premix catalyst composition in which a portion of the conjugated diene-based monomer used in the polymerization reaction is pre-polymerized by being premixed with the catalyst composition for polymerization, catalyst composition activity may not only be improved, but a conjugated diene-based polymer thus prepared may be stabilized.

In the present invention, the expression "preforming" may denote that, in a case in which a catalyst composition including a lanthanide rare earth element-containing compound, an alkylating agent, and a halide, that is, a catalyst system includes diisobutylaluminum hydride (DIBAH), a small amount of a conjugated diene-based monomer such as 1,3-butadiene, is added to reduce the possibility of producing various catalytically active species, and pre-polymerization is performed in the catalyst composition system with the addition of the 1,3-butadiene. Also, the expression "premix"

may denote a state in which each compound is uniformly mixed in the catalyst composition system without being polymerized.

In this case, with respect to the conjugated diene-based monomer used in the preparation of the catalyst composition, some amount within a total amount range of the conjugated diene-based monomer used in the polymerization reaction may be used, for example, the conjugated diene-based monomer may be used in an amount of 1 mol to 100 mol, particularly, 10 mol to 50 mol, or 20 mol to 50 mol based on 1 mol of the lanthanide rare earth element-containing compound.

The catalyst composition according to an embodiment of the present invention may be prepared by sequentially mixing the above-described lanthanide rare earth element-containing compound and at least one of the alkylating agent, the halide, and the conjugated diene-based monomer, specifically, the lanthanide rare earth element-containing compound, the alkylating agent, the halide, and selectively the conjugated diene-based monomer, in an organic solvent. In this case, the organic solvent may be a hydrocarbon solvent that is not reactive with the components of the catalyst composition. Specifically, the hydrocarbon solvent may include linear, branched, or cyclic aliphatic hydrocarbon having 5 to 20 carbon atoms such as n-pentane, n-hexane, n-heptane, n-octane, n-nonane, n-decane, isopentane, isohexane, isopentane, isooctane, 2,2-dimethylbutane, cyclopentane, cyclohexane, methylcyclopentane, and methylcyclohexane; a mixed solvent of aliphatic hydrocarbon having 5 to 20 carbon atoms such as petroleum ether or petroleum spirits, and kerosene; or an aromatic hydrocarbon-based solvent such as benzene, toluene, ethylbenzene, and xylene, and any one thereof or a mixture of two or more thereof may be used. The hydrocarbon solvent may more specifically be the above-described linear, branched, or cyclic aliphatic hydrocarbon having 5 to 20 carbon atoms or the above-described mixed solvent of aliphatic hydrocarbon, and more particularly, may be n-hexane, cyclohexane, or a mixture thereof.

Also, the organic solvent may be appropriately selected depending on a type of the constituent components constituting the catalyst composition, particularly, the alkylating agent.

Specifically, since alkylaluminoxane such as methylaluminoxane (MAO) and ethylaluminoxane, as the alkylating agent, is not easily dissolved in an aliphatic hydrocarbon-based solvent, an aromatic hydrocarbon-based solvent may be appropriately used.

In addition, if a modified methylaluminoxane is used as the alkylating agent, an aliphatic hydrocarbon-based solvent may be appropriately used. In this case, since a single solvent system may be realized with an aliphatic hydrocarbon-based solvent such as hexane, mainly used as a polymerization solvent, it may be more advantageous to the polymerization reaction. Also, the aliphatic hydrocarbon-based solvent may promote catalytic activity, and may further improve reactivity by the catalytic activity.

Meanwhile, the organic solvent may be used in an amount of 20 mol to 20,000 mol, more particularly, 100 mol to 1,000 mol, based on 1 mol of the lanthanide rare earth element-containing compound.

In the preparation method of the conjugated diene-based polymer according to the present invention, the polymerization may be performed by continuous polymerization in a polymerization reactor including at least two reactors.

Particularly, the polymerization may be performed by continuous polymerization in a polymerization reactor including at least two reactors and in this case, the total number of the reactors may be flexibly adjusted according to reaction conditions and environment.

In addition, the polymerization is performed as continuous polymerization in a polymerization reactor including at least two reactors, but the polymerization reaction in a first reactor and a second reactor is controlled by adjusting the ratio of a polymer to a monomer of a reaction mixture in each reactor.

Here, in the continuous polymerization according to the present invention, if the number of the reactor is greater than 2, and is 3 or more, the weight ratio of the polymer to the monomer may be the ratio in the first reactor and the second reactor.

Particularly, in the polymerization reaction in the first reactor, a ratio of a polymer to a monomer in a reaction mixture, that is, a value obtained by dividing the total weight of the polymer by the total weight of the monomer is 5.6 or more, preferably, 9.0 or more. In addition, the polymerization reaction in the second reactor may be performed until the weight ratio of the polymer to the monomer in the reaction mixture is up to 49.0, preferably, 24.0.

In addition, the retention time of the first reactor and the second reactor is preferably adjusted, and the retention time of the second reactor may be about 75% or less, preferably, 50% or less of the retention time of the first reactor.

In the continuous preparation method of a conjugated diene-based polymer, it is important to control the physical properties of a final polymer and the contaminant degree of a reactor. If the preparation method is applied, the contaminant degree of a reactor may be largely reduced by adjusting the weight ratio of the polymer and the monomer in the first reactor to 5.6 or more, and time for carrying out a continuous process may increase, and thus, the productivity of the conjugated diene-based polymer may be largely increased. In addition, the retention time in the second reactor is required to adjust while adjusting the weight ratio of the polymer and the monomer in the first reactor at the same time, and this adjustment may be related to the weight ratio of the polymer and the monomer in the second reactor. That is, if the polymerization reaction is carried out until the weight ratio of the polymer and the monomer in the second reactor exceeds 49.0, the physical properties of a final conjugated diene-based polymer might be deteriorated, and the weight ratio is required to be adjusted together with the retention time in combination.

In other words, by adjusting the weight ratio of the polymer/monomer of the first reactor to 5.6 or more, the generation of unreacted monomer may be minimized and the reactor contamination may be reduced, and by adjusting the weight ratio of the polymer/monomer of the second reactor to 49.0 or less and the retention time of the second reactor to a degree of about 75% or less of the retention time of the first reactor, the deterioration of the physical properties of a polymer due to hyperpolymerization may be prevented. As described above, by controlling the polymerization reaction in the first reactor and the second reactor via the weight ratio of the polymer/monomer and the retention time, a conjugated diene-based polymer having improved productivity and excellent physical properties, particularly, cis 1,4 bond content and linearity, may be provided.

The preparation method of the conjugated diene-based polymer according to the present invention has excellent productivity and processability and may produce a conjugated diene-based polymer having excellent physical properties by performing continuous polymerization in a polymerization reactor including at least two reactors as described above.

In addition, the preparation method according to an embodiment of the present invention is performed by continuous polymerization in a polymerization reactor including at least two reactors, and by adjusting to satisfy the weight ratio of the polymer and the monomer in the first reactor and adjusting the weight ratio of the polymer and the monomer and the retention time in the second reactor, so as to prevent hyperpolymerization, increase linearity, and to control the molecular weight distribution of a polymer narrow, thereby preparing a conjugated diene-based polymer with improved physical properties such as viscoelasticity properties.

Here, the weight ratio of the polymer and the monomer in the first reactor and the second reactor is related to a polymerization conversion ratio.

The polymerization conversion ratio may be determined, for example, by measuring a solid concentration in a polymer solution including a polymer during polymerizing. Particularly, to secure the polymerization solution, a cylindrical vessel is mounted on the outlet of each polymerization reactor, the vessel is filled with a certain amount of the polymerization solution, the cylindrical vessel is separated from the reactor, the weight (A) of the cylinder filled with the polymerization solution is measured, the polymerization solution in the vessel is transported to an aluminum vessel (for example, an aluminum dish), the weight (B) of the cylindrical vessel from which the polymerization solvent is removed is measured, the aluminum vessel including the polymerization solution is dried in an oven of 140° C. for 30 minutes, the weight (C) of the dried polymer is measured, and the polymerization conversion ratio is calculated by the following Mathematical Formula 4:

[Mathematical Formula 4]

$$\text{Polymerization conversion ratio (\%)} = \frac{C}{A-B} \times \text{Total solid content}(TSC)\text{ of each reactor}$$

That is, a practically measured polymerization conversion ratio and the weight ratio of the polymer and the monomer in each reactor may not exactly match. For example, if the weight ratio of the polymer and the monomer in the first reactor is 5.6 or more, it means that if 1 part by weight of the monomer is present, 5.6 parts by weight of the polymer is present. In this case, the conversion ratio by simple conversion calculation, may be about 84.8% (=5.6/6.6) or more, preferably, 90% or more. Similarly, the conversion ratio in the second reactor by calculation may be about 98% or less, preferably, 96% or less.

However, as described above, the conversion ratio is obtained by simple conversion, and the values may be different from the conversion ratio derived from a general method for measuring a conversion ratio according to circumstances.

In addition, the retention time of reactants in the first reactor during polymerization may preferably be 10 minutes to 120 minutes, particularly, 15 minutes to 100 minutes, or 20 minutes to 80 minutes. If the retention time is in the above range, the adjustment of the polymerization conversion ratio may be easy, but is not limited thereto, and the ratio with the retention time of reactants in the second reactor may act as a more significant factor. The appropriate adjustment of the ratio may be favorable in view of the securing of the physical properties of a conjugated diene-based polymer.

Continuous operation time in the preparation method according to an embodiment of the present invention may be largely increased, and the continuous operation time of the reaction process is directly connected with the productivity of a conjugated diene-based polymer, and if the continuous operation time is short, cost and time consumed for cleaning reactors, and cost and time according to the increase of the number of stopping times of the reactors may become quite significant. However, by the preparation method according to the present invention, a process time may be increased up to 5 times a case where the weight ratio of the polymer/monomer and the retention time of the second reactor are not adjusted, and thus, cost and time may be saved to a considerable degree, and effect of largely increasing productivity may be achieved.

Furthermore, the polymerization may be a polymerization with heating, an isothermal polymerization, or a polymerization at a constant temperature (adiabatic polymerization).

Herein, the constant temperature polymerization denotes a polymerization method including a step of performing polymerization not by optionally applying heat but with its own reaction heat after the catalyst composition is injected, the polymerization with heating denotes a polymerization method in which the temperature is increased by optionally applying heat after the catalyst composition is injected, and the isothermal polymerization denotes a polymerization method in which the temperature of the polymer is constantly maintained by taking away heat or applying heat after the catalyst composition is injected.

In addition, the polymerization may be performed by coordination anionic polymerization or radical polymerization, may specifically be bulk polymerization, solution polymerization, suspension polymerization, or emulsion polymerization, more particularly, solution polymerization.

The polymerization may be performed in a temperature range of −20° C. to 200° C., particularly in a temperature range of 20° C. to 150° C., more particularly 10° C. to 120° C. or 60° C. to 90° C. for 15 minutes to 3 hours. If the temperature during the polymerization is greater than 200° C., it is difficult to sufficiently control the polymerization reaction and the cis 1,4 bond content of the produced diene-based polymer may be decreased, and, if the temperature is less than −20° C., polymerization rate and efficiency may be reduced.

Also, in the preparation method of a conjugated diene-based polymer according to an embodiment of the present invention, after preparing an active polymer, a step of terminating polymerization by further using an additive, for example, a reaction terminating agent for the completion of the polymerization reaction such as polyoxyethylene glycol phosphate; or an antioxidant such as 2,6-di-t-butylpara-cresol. In addition, together with the reaction terminating agent, an additive that facilitates solution polymerization, for example, an additive such as a chelating agent, a dispersant, a pH adjuster, a deoxidizer, and an oxygen scavenger, may be further selectively used.

Meanwhile, the preparation method of the conjugated diene-based polymer according to an embodiment of the present invention may include a modification reaction step for modifying at least one terminal of the active polymer.

Particularly, the preparation method may include a modification reaction step of reacting or coupling the active polymer with a modifier to modify at least one terminal of the active polymer after polymerization.

In this case, a compound capable of imparting a functional group to at least one terminal of the active polymer or increasing molecular weight via coupling may be used as the modifier, for example, a compound including at least one functional group selected from azacyclopropane, ketone, carboxyl, thiocarboxyl, carbonate, carboxyl anhydride, metal carboxylate, oxyhalogenide, urea, thiourea, amide, thioamide, isocyanate, thioisocyanate, halogenated isocyano, epoxy, thioepoxy, imine and a M-Z bond (where M is selected from Sn, Si, Ge and P, and Z is a halogen atom), and not including an active proton and an onium salt.

The modifier may be used in an amount of 0.5 mol to 20 mol based on 1 mol of the lanthanide rare earth element-containing compound in the catalyst composition. Specifically, the modifier may be used in an amount of 1 mol to 10 mol based on 1 mol of the lanthanide rare earth element-containing compound in the catalyst composition.

In addition, the modification reaction may be performed at 0° C. to 90° C. for 1 minute to 5 hours.

After the completion of the above-described modification reaction, the polymerization reaction may be terminated by adding an isopropanol solution of 2,6-di-t-butyl-p-cresol (BHT) to a polymerization reaction system. Thereafter, a modified conjugated diene-based polymer may be obtained through a desolvation treatment, such as steam stripping in which a partial pressure of the solvent is reduced by supplying water vapor, or a vacuum drying treatment. Also, in addition to the above-described modified conjugated diene-based polymer, an unmodified active polymer, an active polymer may be included in a reaction product obtained as a result of the above-described modification reaction.

In addition, the present invention provides a conjugated diene-based polymer prepared via the preparation method.

The modified conjugated diene-based polymer may have a number average molecular weight (Mn) of 100,000 g/mol to 500,000 g/mol, particularly, 200,000 g/mol to 300,000 g/mol.

Also, the modified conjugated diene-based polymer may have a weight average molecular weight (Mw) of 500,000 g/mol to 1,000,000 g/mol, particularly, 600,000 g/mol to 900,000 g/mol.

Furthermore, the modified conjugated diene-based polymer may have molecular weight distribution (MWD, Mw/Mn) of 1.5 to 4.0, and thus, if applied to a rubber composition, tensile properties and viscoelasticity properties may be improved.

In addition, in consideration of an improvement in balance between mechanical properties, an elastic modulus, and processability of a rubber composition when the modified conjugated diene-based polymer according to an embodiment of the present invention is used in the rubber composition, the weight average molecular weight and the number average molecular weight may satisfy the above-described ranges at the same time while the modified conjugated diene-based polymer has the above-described molecular weight distribution range.

Particularly, the modified conjugated diene-based polymer may have a molecular weight distribution of 4.0 or less, a weight average molecular weight of 500,000 g/mol to 1,000,000 g/mol, and a number average molecular weight of 100,000 g/mol to 500,000 g/mol.

Herein, each of the weight average molecular weight and the number average molecular weight is a polystyrene-converted molecular weight analyzed by gel permeation chromatography (GPC), and the molecular weight distribution (Mw/Mn) is also known as polydispersity, wherein it was calculated as the ratio (Mw/Mn) of the weight-average molecular weight (Mw) to the number-average molecular weight (Mn). In addition, the number average molecular weight is a common average of the molecular weight of individual polymer, which is calculated by measuring the molecular weights of n polymer molecules, obtaining the total of the molecular weights, and dividing by n, and the weight average molecular weight represents molecular weight distribution.

In addition, the modified conjugated diene-based polymer according to an embodiment of the present invention may have a β value of 0.155 or more, particularly, 0.160 or more as described above, and if the modified conjugated diene-based polymer is applied to a rubber composition, resistance properties and fuel consumption properties may be excellent.

Here, the β value denotes the change of viscoelasticity coefficient according to the frequency change in response to the same amount of strain, wherein it is an index indicating linearity of a polymer. Commonly, the linearity of the polymer is low as the β value is reduced, and rolling resistance or resistance to rotation when the polymer is used in the rubber composition is increased as the linearity is reduced. The β value is obtained by obtaining a slope of Log(1/tan delta) vs Log(Freq.) by performing frequency sweep of each polymer in conditions of 100° C. with strain of 7% by using a rubber process analyzer (RPA2000, AlphsTechnoligies Co.), and by calculating thereby. In this case, the frequency was set to 2, 5, 10, 20, 50, 100, 200, 500, 1,000, and 2,000 cpm.

Also, the conjugated diene-based polymer may have a cis 1,4 bond content of a conjugated diene portion, which is measured by Fourier transform infrared spectroscopy (FT-IR), of 95% or more, more particularly, 96% or more. Thus, abrasion resistance, crack resistance, and ozone resistance of a rubber composition may be improved when the conjugated diene-based polymer is applied to the rubber composition.

Herein, the cis-1,4 bond content is a value measured by the Fourier transform infrared spectroscopy (FT-IR) in which, after measuring a FT-IR transmittance spectrum of a carbon disulfide solution of the conjugated diene-based polymer which is prepared at a concentration of 5 mg/mL by using disulfide carbon of the same cell as a blank, each content was obtained by using a maximum peak value (a, base line) near 1,130 $cm^{-1}$ of the measurement spectrum, a minimum value (b) near 967 $cm^{-1}$ which indicates a trans 1,4 bond, a minimum value (c) near 911 $cm^{-1}$ which indicates a vinyl bond, and a minimum value (d) near 736 $cm^{-1}$ which indicates a cis 1,4 bond.

Furthermore, the modified conjugated diene-based polymer may have a vinyl content of the conjugated diene part, which is measured by Fourier transform infrared spectroscopy, of 5% or less, more particularly, 2% or less. If the vinyl content in the polymer is greater than 5%, the abrasion resistance, crack resistance, and ozone resistance of the rubber composition including the same may be deteriorated.

Meanwhile, according to an embodiment of the present invention, if the preparation method includes a modification reaction step, the conjugated diene-based polymer prepared via the preparation method may be a modified conjugated diene-based polymer in which a functional group derived from a modifier is introduced to at least one terminal.

Furthermore, the present invention provides a rubber composition including the modified conjugated diene-based polymer and a molded article prepared from the rubber composition.

The rubber composition according to an embodiment of the present invention may include the conjugated diene-based polymer in an amount of 0.1 wt % to 100 wt %, particularly, 10 wt % to 100 wt %, more particularly, 20 wt % to 90 wt %. If the amount of the modified conjugated diene-based polymer is less than 0.1 wt %, an effect of improving abrasion resistance and crack resistance of a molded article prepared by using the rubber composition, for example, a tire, may be insignificant.

Also, the rubber composition may further include other rubber components, if necessary, in addition to the modified conjugated diene-based polymer, and, in this case, the rubber component may be included in an amount of 90 wt % or less based on the total weight of the rubber composition. Specifically, the rubber component may be included in an amount of 1 part by weight to 900 parts by weight based on 100 parts by weight of the modified conjugated diene-based polymer.

The rubber component may be a natural rubber or a synthetic rubber, and, for example, the rubber component may be a natural rubber (NR) including cis-1,4-polyisoprene; a modified natural rubber, such as an epoxidized natural rubber (ENR), a deproteinized natural rubber (DPNR), and a hydrogenated natural rubber, in which the general natural rubber is modified or purified; and a synthetic rubber such as a styrene-butadiene rubber (SBR), polybutadiene (BR), polyisoprene (IR), a butyl rubber (IIR), an ethylene-propylene copolymer, polyisobutylene-co-isoprene, neoprene, poly(ethylene-co-propylene), poly(styrene-co-butadiene), poly(styrene-co-isoprene), poly(styrene-co-isoprene-co-butadiene), poly(isoprene-co-butadiene), poly(ethylene-co-propylene-co-diene), a polysulfide rubber, an acrylic rubber, an urethane rubber, a silicon rubber, an epichlorohydrin rubber, a butyl rubber, and a halogenated butyl rubber. Any one thereof or a mixture of two or more thereof may be used.

Furthermore, the rubber composition may include 0.1 parts by weight to 150 parts by weight of a filler based on 100 parts by weight of the conjugated diene-based polymer, and the filler may include a silica-based filler, a carbon black-based filler, or a combination thereof. Specifically, the filler may be carbon black.

The carbon black-based filler is not particularly limited, but, for example, may have a nitrogen surface area per gram (N2SA, measured according to JIS K 6217-2:2001) of 20 $m^2/g$ to 250 $m^2/g$. Also, the carbon black may have a dibutyl phthalate (DBP) oil absorption of 80 cc/100 g to 200 cc/100 g. If the nitrogen surface area per gram of the carbon black is greater than 250 $m^2/g$, processability of a rubber composition may be reduced, and, if the nitrogen surface area per gram of the carbon black is less than 20 $m^2/g$, reinforcement by carbon black may be insignificant. Furthermore, if the DBP oil absorption of the carbon black is greater than 200 cc/100 g, the processability of the rubber composition may be reduced, and, if the DBP oil absorption of the carbon black is less than 80 cc/100 g, the reinforcement by carbon black may be insignificant.

Also, the silica is not particularly limited, but, for example, may include wet silica (hydrous silicic acid), dry silica (anhydrous silicic acid), calcium silicate, aluminum silicate, or colloidal silica. Specifically, the silica may be wet silica in which an effect of improving both fracture characteristics and wet grip is the most significant. Furthermore, the silica may have a nitrogen surface area per gram (N2SA) of 120 $m^2/g$ to 180 $m^2/g$, and a cetyltrimethylammonium bromide (CTAB) surface area per gram of 100 $m^2/g$ to 200 $m^2/g$. If the nitrogen surface area per gram of the silica is less than 120 $m^2/g$, reinforcement by silica may be reduced, and, if the nitrogen surface area per gram of the silica is greater than 180 $m^2/g$, the processability of a rubber composition may be reduced. Also, if the CTAB surface area per gram of the silica is less than 100 $m^2/g$, the reinforcement by silica, as the filler, may be reduced, and, if the CTAB surface area per gram of the silica is greater than 200 $m^2/g$, the processability of a rubber composition may be reduced.

If silica is used as the filler, a silane coupling agent may be used together for the improvement of reinforcement and low heat generation property.

Specific examples of the silane coupling agent may be bis(3-triethoxysilylpropyl)tetrasulfide, bis(3-triethoxysilylpropyl)trisulfide, bis(3-triethoxysilylpropyl)disulfide, bis(2-triethoxysilylethyl)tetrasulfide, bis(3-trimethoxysilylpropyl) tetrasulfide, bis(2-trimethoxysilylethyl)tetrasulfide, 3-mercaptopropyl trimethoxysilane, 3-mercaptopropyl triethoxysilane, 2-mercaptoethyl trimethoxysilane, 2-mercaptoethyl triethoxysilane, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 3-trimethoxysilylpropyl benzothiazolyl tetrasulfide, 3-triethoxysilylpropyl benzolyl tetrasulfide, 3-triethoxysilylpropyl methacrylate monosulfide, 3-trimethoxysilylpropyl methacrylate monosulfide, bis(3-diethoxymethylsilylpropyl)tetrasulfide, 3-mercaptopropyl dimethoxymethylsilane, dimethoxymethylsilylpropyl-N,N-dimethylthiocarbamoyl tetrasulfide, or dimethoxymethylsilylpropyl benzothiazolyl tetrasulfide, and any one thereof or a mixture of two or more thereof may be used. More particularly, in consideration of the effect of improving the reinforcement, the silane coupling agent may be bis(3-triethoxysilylpropyl)polysulfide or 3-trimethoxysilylpropyl benzothiazyl tetrasulfide.

Also, the rubber composition according to the embodiment of the present invention may be sulfur cross-linkable, and, accordingly, may further include a vulcanizing agent.

The vulcanizing agent may specifically be sulfur powder, and may be included in an amount of 0.1 parts by weight to 10 parts by weight based on 100 parts by weight of the rubber component. When the vulcanizing agent is included within the above range, elastic modulus and strength required for a vulcanized rubber composition may be secured and, simultaneously, a low fuel consumption ratio may be obtained.

Furthermore, the rubber composition according to an embodiment of the present invention may further include various additives, such as a vulcanization accelerator, a process oil, a plasticizer, an antiaging agent, a scorch inhibitor, zinc white, stearic acid, a thermosetting resin, or a thermoplastic resin, used in the general rubber industry, in addition to the above-described components.

The vulcanization accelerator is not particularly limited, but, specifically, a thiazole-based compound, such as 2-mercaptobenzothiazole (M), dibenzothiazyl disulfide (DM), and N-cyclohexylbenzothiazole-2-sulfenamide (CZ), or a guanidine-based compound, such as diphenylguanidine (DPG), may be used. The vulcanization accelerator may be included in an amount of 0.1 parts by weight to 5 parts by weight based on 100 parts by weight of the rubber component.

Also, the process oil acts as a softener in the rubber composition, wherein the process oil may be a paraffin-based, naphthenic-based, or aromatic-based compound, and more particularly, the aromatic-based compound may be used in consideration of tensile strength and abrasion resistance, and the naphthenic-based or paraffin-based process oil may be used in consideration of hysteresis loss and low temperature characteristics. The process oil may be included in an amount of 100 parts by weight or less based on 100 parts by weight of the rubber component, and if the process oil is included in the above amount, decreases in tensile strength and low heat generation property (low fuel consumption ratio) of the vulcanized rubber may be prevented.

Furthermore, specific examples of the antiaging agent may be N-isopropyl-N'-phenyl-p-phenylenediamine, N-(1, 3-dimethylbutyl)-N'-phenyl-p-phenylenediamine, 6-ethoxy-2,2,4-trimethyl-1,2-dihydroquinoline, or a high-temperature condensate of diphenylamine and acetone. The antiaging agent may be used in an amount of 0.1 parts by weight to 6 parts by weight based on 100 parts by weight of the rubber component.

The rubber composition according to an embodiment of the present invention may be obtained by kneading the above mixing formulation using a kneader such as a Banbury mixer, a roll, and an internal mixer, and a rubber composition having excellent abrasion resistance as well as low heat generation property may be obtained by a vulcanization process after molding.

Accordingly, the rubber composition may be suitable for the preparation of each member of a tire, such as a tire's tread, an under tread, a sidewall, a carcass coating rubber, a belt coating rubber, a bead filler, a chafer, and a bead coating rubber, or various industrial rubber products such as an anti-vibration rubber, a belt conveyor, and a hose.

The molded article prepared by using the rubber composition may include a tire or a tire's tread.

EXAMPLES

Hereinafter, the present invention will be described in more detail, according to specific examples and experimental examples. However, the following examples and experimental examples are merely presented to exemplify the present invention, and the scope of the present invention is not limited thereto.

Example 1

1) Preparation of Catalyst Composition

A catalyst composition was prepared using a catalyst reactor in which two stainless reactors were connected in series.

To a first reactor, $Nd(2\text{-ethylhexanoate})_3$, diisobutylaluminum hydride, and 1,3-butadiene were injected and mixed, and then, continuously transported to a second stainless reactor. Diethylaluminum chloride was injected thereto and mixed, and used for polymerization.

2) Preparation of Conjugated Diene-Based Polymer

A conjugated diene-based polymer was prepared by using a polymerization reactor in which two 80 L stainless reactors provided with agitators and jackets were connected in series. The inside of each reactor was maintained at 70° C. and 0-3 bar.

The catalyst composition prepared above, n-hexane and 1,3-butadiene were injected via the top of a first reactor. The injection amount of 1,3-butadiene was 5,000 g, and n-hexane was injected such that total solid content (TSC) when a conversion ratio was 100%, became 15%. The injection amount of a catalyst was adjusted so that the ratio of a polymer to a monomer in the first reactor was 9.0. The level of a reactor was controlled so that the retention time of the first reactor was a predetermined value, and then transported to a second reactor by using a gear pump. The retention time of the second reactor was adjusted by changing level such that the ratio of a polymer to a monomer of the second reactor was 24.0, and the retention time of the second reactor was 50% of the retention time of the first reactor. A cement obtained when the ratio of the polymer to the monomer in the second reactor reached 24.0 was transported to a recovery step by using a gear pump, and the polymerization was terminated by adding a polymerization terminator and an antioxidant. Then, the solvents were removed via steam stripping, and a conjugated diene-based polymer was prepared by drying using a hot roll.

Example 2

A conjugated diene-based polymer was prepared by the same method described in Example 1 except for adjusting the ratio of the polymer to the monomer in the first reactor to 5.6, the ratio of the polymer to the monomer in the second reactor to 49.0, and the retention time of the second reactor to 75% of the retention time of the first reactor during preparing the conjugated diene-based polymer.

Example 3

A conjugated diene-based polymer was prepared by the same method described in Example 1 except for adjusting the ratio of the polymer to the monomer in the first reactor to 5.6, the ratio of the polymer to the monomer in the second reactor to 24.0, and the retention time of the second reactor to 60% of the retention time of the first reactor during preparing the conjugated diene-based polymer.

Example 4

A conjugated diene-based polymer was prepared by the same method described in Example 1 except for adjusting the ratio of the polymer to the monomer in the first reactor to 9.0, the ratio of the polymer to the monomer in the second reactor to 49.0, and the retention time of the second reactor to 60% of the retention time of the first reactor during preparing the conjugated diene-based polymer.

Comparative Example 1

A conjugated diene-based polymer was prepared by the same method described in Example 1 except for adjusting the ratio of the polymer to the monomer in the first reactor to 3.0, the ratio of the polymer to the monomer in the second reactor to 19.0, and the retention time of the second reactor to 100% of the retention time of the first reactor during preparing the conjugated diene-based polymer.

Comparative Example 2

A conjugated diene-based polymer was prepared by the same method described in Example 1 except for adjusting the ratio of the polymer to the monomer in the first reactor to 4.0, the ratio of the polymer to the monomer in the second reactor to 65.7, and the retention time of the second reactor to 100% of the retention time of the first reactor during preparing the conjugated diene-based polymer.

Comparative Example 3

A conjugated diene-based polymer was prepared by the same method described in Example 1 except for adjusting the ratio of the polymer to the monomer in the first reactor to 5.6, the ratio of the polymer to the monomer in the second reactor to 199.0, and the retention time of the second reactor to 100% of the retention time of the first reactor during preparing the conjugated diene-based polymer.

Experimental Example 1

Physical properties of each of the conjugated diene polymers of the examples and the comparative examples were respectively measured by the methods below, and the results thereof are listed in Table 1.

1) Mooney Viscosity (RP, Raw polymer) and −S/R Value

Mooney viscosity (ML 1+4, @ 100° C.) (MU) of each polymer was measured with a large rotor at a rotor speed of 2±0.02 rpm at 100° C. using MV2000E by Monsanto Co. After each specimen was stood for 30 minutes or more at room temperature (23±3° C.), 27±3 g of each specimen was taken as a sample used in this case and filled into a die cavity, and Mooney viscosity was measured while applying a torque by operating a platen. In addition, after measuring the Mooney viscosity, the change of the Mooney viscosity shown by the relief of the torque was observed for 1 minute, and from the slope value thereof, −S/R value was determined.

2) Cis Bond Content Measurement

Cis bond content in each polymer was measured by using Varian VNMRS 500 MHz NMR, and 1,1,2,2-tetrachloroethane D2 (Cambridge Isotope Co.) was used as a solvent.

3) Beta (β) Value Measurement

The linearity of each polymer was measured by using a rubber process analyzer (RPA2000, AlphaTechnoligies Co.).

Particularly, frequency sweep of each polymer was performed in conditions of 100° C. with strain of 7%. In this case, the frequency was set to 2, 5, 10, 20, 50, 100, 200, 500, 1,000, and 2,000 cpm, and the β value was obtained by calculating a slope of Log(1/tan delta) vs Log(Freq.). Here, the higher β value is, the higher the linearity of the polymer is.

4) Weight-Average Molecular Weight (Mw), Number-Average Molecular Weight (Mn), and Molecular Weight Distribution Each polymer was dissolved in tetrahydrofuran (THF) at 40° C. for 30 minutes, and then loaded and flowed into a gel permeation chromatography (GPC) column. In this case, as the column, two PLgel Olexis (product name) columns by Polymer Laboratories and one PLgel mixed-C (product name) column by Polymer Laboratories were combined and used. Also, all newly replaced columns were mixed-bed type columns, and polystyrene was used as a GPC standard material.

5) Continuous Operation Time

The reactor contamination is mainly generated at the bottom of a first reactor and in a pipe line for transporting from a first reactor to a second reactor, and due to the accumulation of contaminants, the outlet of the first reactor and the pipe are blocked and the transportation becomes impossible and normal continuous polymerization becomes impossible. Continuous operation time was shown by measuring time from a point when polymerization was initiated in the first reactor to a point when the transportation became impossible due to the blocking of the outlet of the reactor and the pipe by contamination.

TABLE 1

| Category | Example 1 | Example 2 | Example 3 | Example 4 | Comp. Example 1 | Comp. Example 2 | Comp. Example 3 |
|---|---|---|---|---|---|---|---|
| Polymer/monomer (R1*) | 9.0 | 5.6 | 5.6 | 9.0 | 3.0 | 4.0 | 5.6 |
| Polymer/monomer (R2*) | 24.0 | 49.0 | 24.0 | 49.0 | 19.0 | 65.7 | 199.0 |
| Retention time ratio (R2/R1) | 0.5 | 0.75 | 0.6 | 0.6 | 1.0 | 1.0 | 1.0 |
| Continuous operation time (hr) | 150 | 96 | 96 | 150 | 30 | 60 | 96 |
| Mooney viscosity (MU) | 46 | 46 | 44 | 46 | 41 | 43 | 45 |
| Cis bond content (wt %) | 96.2 | 96.4 | 96.4 | 96.3 | 97.1 | 97.1 | 95.8 |
| β value | 0.164 | 0.161 | 0.167 | 0.152 | 0.160 | 0.150 | 0.112 |
| -S/R value | 0.653 | 0.598 | 0.654 | 0.543 | 0.658 | 0.572 | 0.512 |
| Mn ($\times 10^5$ g/mol) | 2.11 | 2.13 | 2.26 | 2.38 | 2.38 | 2.28 | 2.17 |
| Mw ($\times 10^5$ g/mol) | 5.23 | 5.09 | 5.45 | 5.92 | 5.90 | 5.71 | 5.66 |
| MWD | 2.5 | 2.4 | 2.4 | 2.5 | 2.5 | 2.5 | 2.6 |

*R1 and R2 respectively represent a first reactor and a second reactor.

Referring to Table 1, in the examples according to the preparation method of the present invention, the ratios of the polymer and the monomer in the first reactor and the second reactor were adjusted to 5.6 or more and 49.0 or less, respectively, and the retention time in the second reactor was adjusted, and as a result, it was found that conjugated diene-based polymers with high cis bond content and excellent linearity were prepared, when compared to the comparative examples in which the ratios were not adjusted. Further, the contaminant degree of the reactor was markedly reduced, and the continuous operation time was largely increased.

Particularly, in Comparative Example 1, in which the weight ratio of the polymer and the monomer in the second reactor was adjusted to conditions, but the weight ratio of the polymer and the monomer in the first reactor was too small, the linearity or the cis bond content was large, but the contaminant degree of the reactor was considerable, and the continuous operation was carried out only for 30 minutes. Thus, the productivity was decreased by about 5 times that of Example 1.

In addition, in Comparative Example 2, the ratio of the polymer and the monomer in the first reactor was set to 4.0 similar to that of Comparative Example 1, while largely increasing the ratio of the polymer and the monomer in the second reactor. The contaminant degree of the reactor was partially improved when compared to Comparative Example 1 and the continuous operation time was somewhat increased, but the productivity was still low and the linearity was deteriorated when compared to the degrees of the examples.

In addition, in Comparative Example 3, the ratio of the polymer and the monomer in the first reactor was adjusted, but the adjustment of the ratio in the second reactor was failed. Thus, it was found that the contaminant degree of the reactor was satisfied to a certain degree, but the physical properties such as linearity and cis bond content were considerably damaged.

Through controlling the polymerization reaction by adjusting the ratio of the polymer and the monomer in each of the first reactor and the second reactor in the continuous preparation method of a conjugated diene-based polymer, the contaminant degree of the reactor may be largely reduced and the productivity may be markedly improved. At the same time, a polymer having improved linearity and high cis bond content may be provided.

Experimental Example 2

After preparing rubber compositions and rubber specimens using the conjugated diene-based polymers prepared in the examples and the comparative examples, 300% modulus, and mooney viscosity properties (resistance to rotation) were measured, respectively. The results are listed in Table 2 below.

Specifically, 70 parts by weight of carbon black, 22.5 parts by weight of a process oil, 2 parts by weight of an antiaging agent (TMDQ), 3 parts by weight of zinc oxide (ZnO), and 2 parts by weight of stearic acid were mixed with 100 parts by weight of each of the polymers to prepare each rubber composition. Thereafter, 2 parts by weight of sulfur, 2 parts by weight of a vulcanization accelerator (CZ), and 0.5 parts by weight of a vulcanization accelerator (DPG) were added to each rubber composition, and gently mixed at 50° C. for 1.5 minutes in 50 rpm and then, a vulcanized mixture compound in a sheet shape was obtained using a roll of 50° C. The vulcanized mixture compound was vulcanized at 160° C. for 25 minutes to prepare a rubber specimen.

1) 300% Modulus (kg·f/$cm^2$)

Each rubber composition was vulcanized at 150C. for t90 minutes, and the modulus when 300% elongation (M-300%) of a vulcanized product was measured according to ASTM D412.

2) Rolling Resistance Index (LRR, Tan δ @60° C.)

With respect to Tan δ property that is the most important for low fuel consumption ratio, a viscoelasticity coefficient (tan δ) was measured at a frequency of 10 Hz, a prestrain of 3%, a dynamic strain of 3%, and a temperature of 60° C. using DMTS 500N by Gabo Instruments, Germany. In this case, the lower the tan δ was at 60° C., the lower the hysteresis loss was and the better the resistance to rotation was, i.e., the better the fuel consumption ratio was.

TABLE 2

| Category | Example 1 | Example 2 | Example 3 | Example 4 | Comp. Example 1 | Comp. Example 2 | Comp. Example 3 |
|---|---|---|---|---|---|---|---|
| 300% Modulus (kgf/$cm^2$) | 94 | 95 | 95 | 94 | 92 | 95 | 87 |
| LRR (tanδ 60° C.) | 0.155 | 0.152 | 0.153 | 0.151 | 0.150 | 0.148 | 0.164 |

As shown in Table 2, it was found that the physical properties of Examples 1 and 2 were similar to those of the examples, but the contamination of the reactors were significant as described above, and practical application in mass production was difficult. On the contrary, it was found that Comparative Example 3 had long continuous operation time than Comparative Examples 1 and 2, but the deterioration of the physical properties were serious degree. Accordingly, in consideration of the contaminant degree of the reactor and the final mixture properties, it may be found that the adjustment of the ratio of the polymer and the monomer in the first reactor and the second reactor and the adjustment of the retention time ratio are necessary.

The invention claimed is:

1. A method of preparing a conjugated diene-based polymer by a continuous preparation method which is performed in two or more reactors, the method comprising:

injecting a conjugated diene-based monomer to a first reactor to prepare a conjugated diene-based polymer, wherein a polymerization reaction is performed so that a weight ratio of a polymer to a monomer in a reaction mixture in the first reactor is 5.6 or more, and transporting the reaction mixture to a second reactor; and performing a polymerization reaction in the second reactor so that a weight ratio of a polymer to a monomer in a reaction mixture is 49 or less, wherein the polymerization in the first reactor and the second reactor is performed in the presence of a catalyst composition in a hydrocarbon solvent, and a retention time in the second reactor is 75% or less of a retention time in the first reactor.

2. The method of preparing a conjugated diene-based polymer of claim 1, wherein the polymerization in the first reactor is performed so that the weight ratio of the polymer to the monomer in the reaction mixture is 9.0 or more.

3. The method of preparing a conjugated diene-based polymer of claim 1, wherein the polymerization in the second reactor is performed so that the weight ratio of the polymer to the monomer in the reaction mixture is 24 or less.

4. The method of preparing a conjugated diene-based polymer of claim 1, wherein the retention time in the second reactor is 50% or less of the retention time in the first reactor.

5. The method of preparing a conjugated diene-based polymer of claim 1, wherein the conjugated diene-based monomer comprises 1,3-butadiene, isoprene, 2,3-dimethyl-1,3-butadiene, piperylene, 3-butyl-1,3-octadiene, and 2-phenyl-1,3-butadiene, or a mixture of two or more thereof.

6. The method of preparing a conjugated diene-based polymer of claim 1, wherein the polymerization reaction in the first reactor and the second reactor is performed at a temperature of −20° C. to 200° C.

7. The method of preparing a conjugated diene-based polymer of claim 1, wherein the catalyst composition comprises a lanthanide rare earth element-containing compound.

8. The method of preparing a conjugated diene-based polymer of claim 7, wherein the lanthanide rare earth element-containing compound comprises a neodymium compound represented by the following Formula 1:

[Formula 1]

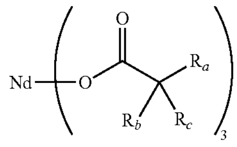

wherein,

Ra to Rc are each independently hydrogen or alkyl of 1 to 12 carbon atoms, where Ra to Rc are not all hydrogen.

9. The method of preparing a conjugated diene-based polymer of claim 8, wherein the neodymium compound comprises Nd(2,2-diethyl decanoate)$_3$, Nd(2,2-dipropyl decanoate)$_3$, Nd(2,2-dibutyl decanoate)$_3$, Nd(2,2-dihexyl decanoate)$_3$, Nd(2,2-dioctyl decanoate)$_3$, Nd(2-ethyl-2-propyl decanoate)$_3$, Nd(2-ethyl-2-butyl decanoate)$_3$, Nd(2-ethyl-2-hexyl decanoate)$_3$, Nd(2-propyl-2-butyl decanoate)$_3$, Nd(2-propyl-2-hexyl decanoate)$_3$, Nd(2-propyl-2-isopropyl decanoate)$_3$, Nd(2-butyl-2-hexyl decanoate)$_3$, Nd(2-hexyl-2-octyl decanoate)$_3$, Nd(2,2-diethyl octanoate)$_3$, Nd(2,2-dipropyl octanoate)$_3$, Nd(2,2-dibutyl octanoate)$_3$, Nd(2,2-dihexyl octanoate)$_3$, Nd(2-ethyl-2-propyl octanoate)$_3$, Nd(2-ethyl-2-hexyl octanoate)$_3$, Nd(2,2-diethyl nonanoate)$_3$, Nd(2,2-dipropyl nonanoate)$_3$, Nd(2,2-dibutyl nonanoate)$_3$, Nd(2,2-dihexyl nonanoate)$_3$, Nd(2-ethyl-2-propyl nonanoate)$_3$, or Nd(2-ethyl-2-hexyl nonanoate)$_3$.

10. The method of preparing a conjugated diene-based polymer of claim 1, wherein the catalyst composition comprises at least one of an alkylating agent, a halide or a conjugated diene-based monomer.

* * * * *